E. R. TALLEY.
BEET TOPPER.
APPLICATION FILED DEC. 1, 1913.
1,124,972.
Patented Jan. 12, 1915.
2 SHEETS—SHEET 1.
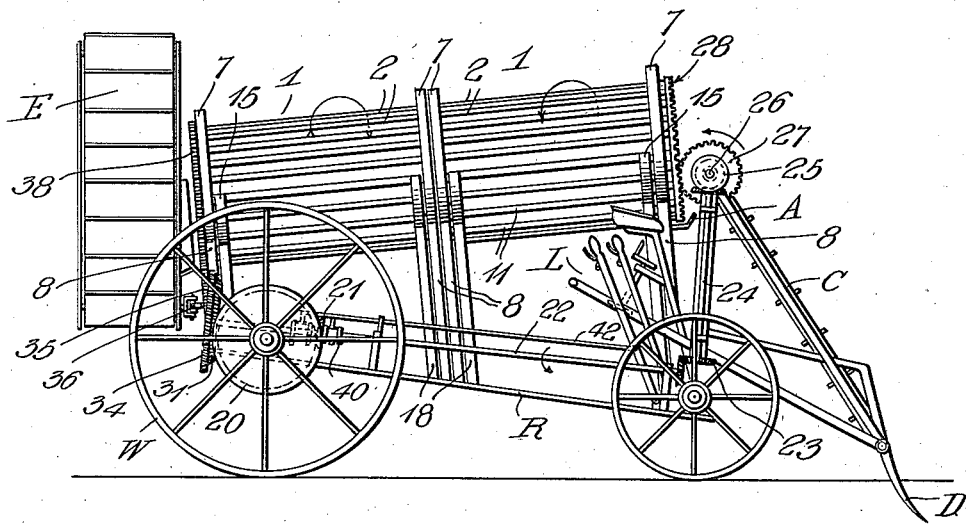
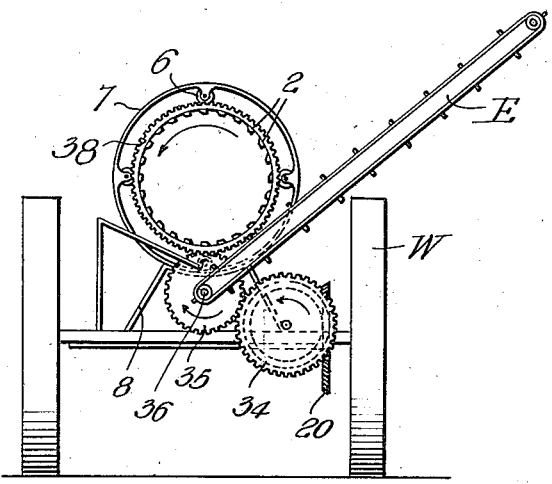
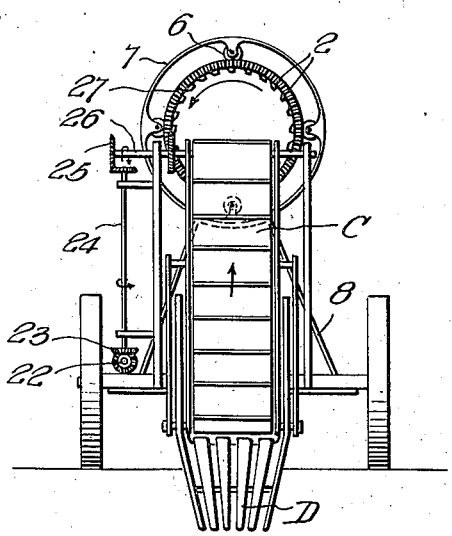
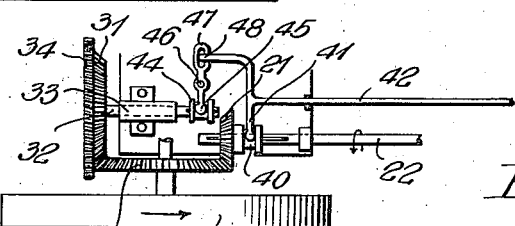
Witnesses
Inventor
E. R. Talley
By H. B. Willson & Co.
Attorneys

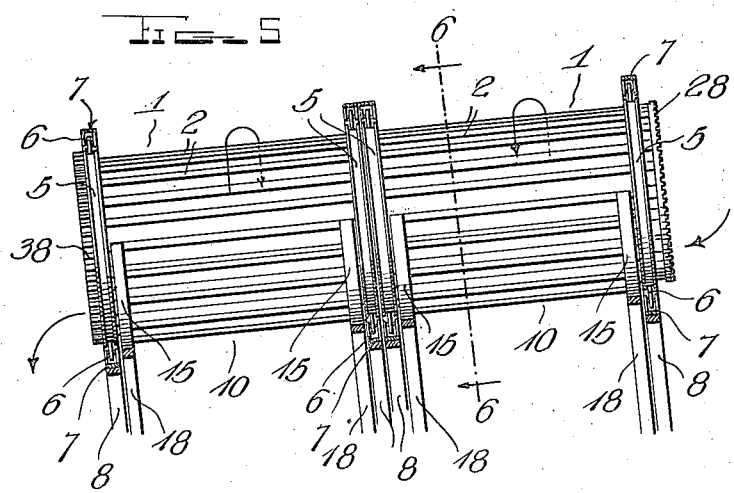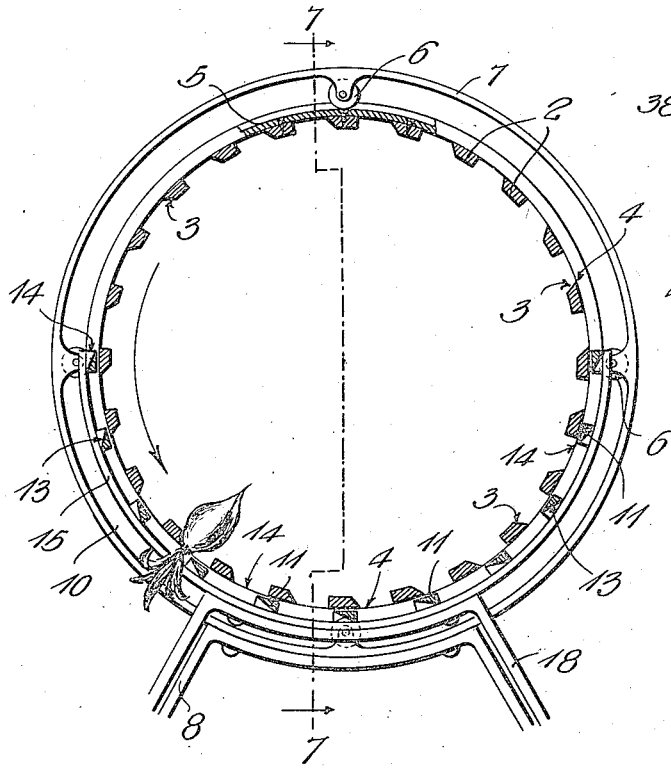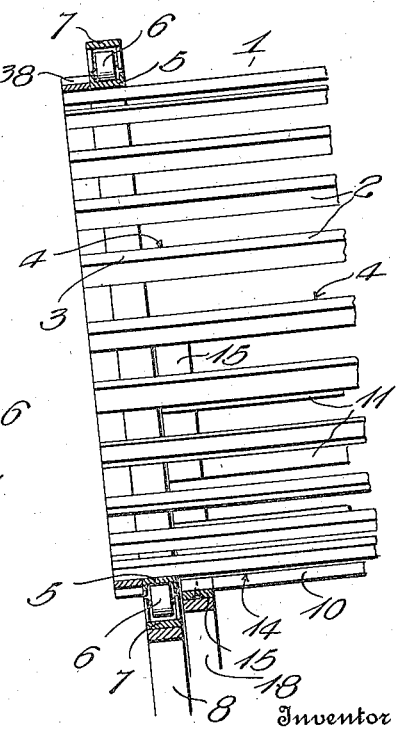

UNITED STATES PATENT OFFICE.

EDWIN R. TALLEY, OF ALGONA, IOWA.

BEET-TOPPER.

1,124,972. Specification of Letters Patent. Patented Jan. 12, 1915.

Application filed December 1, 1913. Serial No. 804,030.

*To all whom it may concern:*

Be it known that I, EDWIN R. TALLEY, a citizen of the United States, residing at Algona, in the county of Kossuth and State of Iowa, have invented certain new and useful Improvements in Beet-Toppers; and I do declare the following to be a full, clear, and exact description of the invention, such as will enable others skilled in the art to which it appertains to make and use the same.

This invention relates to vegetable cutters, and more especially to those which are rotary; and the object of the same is to produce an improved beet topper for cutting the tops off of beets while they are passing through a slightly inclined slatted drum. This object is accomplished by mounting the drum for rotation over a slatted trough, the slats of the parts of course coacting to cut off the tops of the beets while leaving the tuber portion intact within the drum and delivering the same out the rear end of the latter.

The following specification and claims define my preferred construction as shown in the drawings wherein—

Figure 1 is a side view of this machine complete, Fig. 2 a front elevation, and Fig. 3 a rear elevation. Fig. 4 is a plan view on an enlarged scale, showing a detail of the mechanism for throwing the drum into and out of action. Fig. 5 is a side elevation of the drum and trough on a larger scale than as illustrated in Fig. 1. Fig. 6 is a cross section on the line 6—6 of Fig. 5, taken on a still larger scale; and Fig. 7 is a sectional detail taken on the line 7—7 of Fig. 6.

While this improved beet topper may be suitably mounted and supported in a variety of ways, I prefer to utilize it as one element of a beet digging or harvesting machine so that the tops may be severed from the tubers as the vegetable is gathered, and the tops will be dropped back on the land to become fertilizer while the tubers themselves will be delivered by a rear elevator into a wagon drawn alongside or into a suitable receptacle. To this end I have shown the beet digging machine as comprising a running gear R mounted on wheels and propelled by suitable mechanism not illustrated, and having at its front end the diggers D which deliver the beets onto an upwardly moving carrier C, the latter in turn passing them over an apron A into the front end of the drum which forms one of the elements of my present invention. Said running gear also carries at its rear end an elevator E by which the tubers as they fall out the rear end of the slatted drum are carried upward and dropped into a wagon driven alongside or into a suitable receptacle which may be carried by the elevator frame. The letter L designates a group of levers or controls whereby the angle and position of the digger may be adjusted, as also the angle and position of the drum and the elevator. Further details of these parts are not necessary of description, as they constitute no essential features of the present invention.

Coming now to the details of the present invention, the drum is by preference made in two parts disposed end to end. Each part has a cylindrical body 1 composed of a series of parallel slats or bars 2 whose forward faces in the direction of rotation are beveled on their inner sides at 3 to produce cutting edges 4 at their outer front corners, and these slats or bars are surrounded near their ends by rings 5 to maintain them in cylindrical position with respect to each other. These rings are by preference grooved as shown in Fig. 7, and constitute tracks for a series of rollers 6 which latter are mounted within a ring-shaped frame 7 supported by a bracket 8 from the running gear R. As best seen in Figs. 1 and 5, there are two of these supports, one near each end of each part of the drum. Coacting with this two-part cylinder or drum is a trough 10 also made in two parts. Each is composed of a plurality of slats or bars 11 which are beveled on their lower faces as at 13 to produce sharp cutting edges 14 along their inner corners, over which edges move the cutting edges 4 of the drum-bars 2 as the drum rotates; and the trough-bars 11 are connected by bands or strips 15 which hold them rigidly so that they occupy a curve which is only slightly larger than that occupied by the drum-bars 2. Each part of the trough is disposed beneath its respective part of the drum 1 with its bars close to the bars thereof as shown, and is carried on two of said curved bands or strips 15, the latter standing adjacent but out of contact with the rings or frames 7 and being themselves supported by brackets 18 carried by the running gear R in any suitable manner. While any suitable means may be employed for rotating this drum, and the same is made in two parts or sections as shown, I prefer to rotate them in opposite directions and at different speeds, and when the rotation of the parts is to cease, it must be simultaneously. Therefore particular means is necessary for connecting the rotating mechanism with the source of power, which latter in the present instance I have shown as a gear wheel 20 mounted on one of the wheels W of the running gear R. This power gear 20 is by preference beveled as best seen in Fig. 4, and at its forward side it meshes with a beveled pinion 21 which is splined on a shaft 22 leading forward over the running gear as best seen in Fig. 1. The forward end of this shaft is connected by gears 23 or otherwise with an upright shaft 24, and the latter in turn is connected by gears 25 or otherwise with a cross shaft 26 which may well be employed to drive the carrier C although this is not essential. Said shaft 26 is shown as having a gear 27 meshing with teeth 28 on the forward end of the forward part or section of the drum 1. The rear side of the power gear 20 engages with a beveled gear 31 whose shaft 32 slides through its bearing 33, and said beveled gear 31 is rigidly connected with a miter gear 34 which in turn is adapted to mesh with a gear 35 on a shaft 36—the latter being illustrated in Fig. 3 as employed as the driving shaft of the elevator E although this is not essential. Said gear 35 in turn meshes with teeth 38 on the rear end of the rear drum section as shown.

The direction of rotation of parts is indicated by arrows in the various views, and it will be seen that the forward drum section rotates to the right when looking in the direction of travel, and the rearward drum section rotates in the opposite direction. Moreover, the size of the gears 21 and 31 driven by the power gear 20 differs as will be seen from Fig. 4, and therefore the drum sections will be rotated at different speeds.

While I have shown and described the carrier C as connected with the mechanism which drives one drum section and the elevator E as connected with the mechanism which drives the other drum section, this is only a construction which I prefer to employ when the carrier and elevator are used; and it is quite obvious that if the beets are gathered by other means and delivered into the front end of the drum, and are handled by other means after they are delivered from the rear end of the drum, the means for driving the carrier and elevator may be omitted. However, when the topper is mounted on a machine as described and shown herewith, it may be well to have the mechanism which controls the movement of the drum control also the movements of the carrier and elevator, because when the drum is thrown out of action it is desirable that the feed of beets to it and the feed of the treated vegetables from it shall cease.

While any suitable means may be employed for throwing the drum out of action and again into action, I prefer that best illustrated in Fig. 4. The beveled pinion 21 has a grooved hub 40 loosely engaged by a fork 41 at the rear end of a rod 42, and the front end of this rod is connected with one of said levers L as seen in Fig. 1 or with any suitable control within reach of the driver. When the latter is manipulated it is obvious that the fork will slide the beveled pinion 21 back and forth on the shaft 22 and into and out of engagement with the power gear 20. Fast on the shaft 32 near the bearing 33 is a grooved collar 44 loosely engaged by a fork 45 which is pivoted as at 46 to a suitable support, and the other end of this fork is connected as at 47 with an arm or finger 48 projecting from said rod 42. The result is that when this rod is moved the shaft 32 is moved with it through its bearing 33, and the beveled gear 31 is thrown into or out of engagement with the power gear 20—the teeth of the miter gear 34 either sliding into or out of engagement with the idle (or elevator) gear 35, or being so wide that they will retain their engagement therewith while the shaft 32 is adjusted. Therefore the proper setting of this control moves both beveled gears 21 and 31 simultaneously out of engagement with the power gear 20 or into engagement with it, and simultaneously checks the rotation of said drum sections or starts their rotation in the direction indicated. With this construction of parts, the digger picks up the beets as a whole, and they are carried upward by the carrier C and passed over the apron A into the front end of the forward section of the drum, between whose slats their tops fall as they are agitated or tumbled about in their passage to the rear throughout the two sections of this drum. The projecting portions of the tops are caught between the cutting edges 4 and 14 and severed from the tubers, which latter remain within the drum and are dropped out the rear end thereof onto the elevator E, which in turn lifts them and deposits them into a wagon driven alongside or into a suitable receptacle. Therefore it will be seen that when my improved beet topper is mounted on a beet digging machine, the beets are passed through and handled by the topper before they are delivered into the wagon or the receptacle, and the tops fall back on the earth and need no further attention. However, I repeat that it is only my preference that the topper be used in connection with the digger, as it is quite possible to mount it on other supports and drive it from other sources.

The proportions and materials of parts are not essential to the successful operation of the invention.

What is claimed as new is:

1. The herein described beet topper comprising a drum, the body of which is made up of bars beveled on their inner forward corners to provide sharp cutting edges at their outer forward corners, and a trough underlying said drum and made up of bars disposed in contact with the bars of the drum and beveled on their lower sides to form cutting edges which coact with the cutting edges of the drum as the latter is rotated, the whole operated substantially as described.

2. In a beet topper, the combination of a slatted drum, the slats of which have cutting edges at their forward outer corners, and a fixed slatted trough underlying said drum and made up of slats disposed in contact with the bars of the drum and having cutting edges coacting with those on the drum-slats; and means for feeding beets to the inlet end of said drum and removing the beet-tubers from the outlet end of the drum.

3. The herein described beet topper comprising a drum whose axis is slightly elevated at its inlet end, the body of the drum being made up of bars having cutting edges at their forward corners in the direction of rotation, and grooved rings surrounding said bars near their ends, supports for said drum having rollers engaging said rings, a trough underlying said drum and made up of bars having cutting edges coacting with the cutting edges on the drum, and supports for the trough including curved strips connecting its bars near the ends thereof and adjacent said rings.

4. The herein described beet topper comprising a drum whose axis is slightly elevated at its inlet end, the body of the drum being made up of bars having cutting edges at their forward corners in the direction of rotation and grooved rings surrounding said bars near their ends, a ring-shaped frame inclosing each of said grooved rings, rollers carried by said frame and engaging said grooved rings, a slatted trough underlying the drum, curved strips connecting the ends of said slats and standing adjacent said grooved rings, and brackets supporting said curved strips and said ring-shaped frames.

5. In a beet topper, the combination with a drum made up of two parts standing end to end and slightly inclined along their common axis, each part being composed of bars having cutting edges on their forward corners in the direction of rotation and annular tracks connecting the bars near the ends of the latter, supports for said tracks, and means for rotating the parts of said drum differently; of a trough in two parts whereof each part stands beneath one part of the drum and has slats with cutting edges coacting with the edges of the slats in the drum.

6. In a beet topper, the combination with a drum made up of two parts standing end to end and slightly inclined along their common axis, each part being composed of bars having cutting edges on their forward corners in the direction of rotation and annular tracks connecting the bars near the ends of the latter, supports for said tracks, teeth on the outer end of each part of the drum, and driving mechanism including gears meshing with said teeth for driving the drum-parts in different directions; of a trough in two parts whereof each part stands beneath one part of the drum and has slats with cutting edges coacting with the edges of the slats in the drum.

7. In a beet topper, the combination with a two-part drum whereof each part has a slatted body with cutting edges on its slats facing in the direction of rotation, an annular row of teeth on each drum-part, and a slatted trough beneath each part; of a beveled power gear, beveled driven gears meshing with the power gear on opposite sides of the latter, connections between each driven gear and one drum-part, and means for moving said driven gears into or out of mesh with the power gear simultaneously.

8. In a beet topper, the combination with a two-part drum whereof each part has a slatted body with cutting edges on its slats facing in the direction of rotation, an annular row of teeth on each drum-part, and a slatted trough beneath each part; of a beveled power gear, beveled driven gears meshing with the power gear on opposite sides of the latter, connections between said driven gears and the drum sections, said connections including a movable support for each driven gear, forks engaging said supports, a manual control, and connections between the control and forks whereby the driven gears are thrown simultaneously into or out of engagement with said power gear.

In testimony whereof I have hereunto set my hand in presence of two subscribing witnesses.

EDWIN R. TALLEY.

Witnesses:
JOHN B. JOHNSTON,
MABEL E. JACOBSON.